United States Patent [19]
Bruchez, Jr. et al.

[11] Patent Number: 5,893,518
[45] Date of Patent: Apr. 13, 1999

[54] ATTACHMENT MEANS FOR FLAPS OF VARIABLE EXHAUST NOZZLE

[75] Inventors: Raymond J. Bruchez, Jr., Jupiter; M. Craig Lady, Palm Beach Gardens; Gonzalo F. Martinez, Stuart; Bradley C. Johnson, Jupiter, all of Fla.

[73] Assignee: United Technologies Corporation, Hartford, Conn.

[21] Appl. No.: 08/565,599

[22] Filed: Nov. 30, 1995

[51] Int. Cl.$^6$ ..................... B05B 12/00
[52] U.S. Cl. ..................... 239/265.39; 60/271
[58] Field of Search ............ 239/265.19, 265.25, 239/265.33, 265.35, 265.39, 265.37; 60/271; 29/434, 525.02, 525.03; 403/74, 76, 71, 66

[56] References Cited

U.S. PATENT DOCUMENTS

| | | | |
|---|---|---|---|
| 4,994,660 | 2/1991 | Hauer | 239/265.19 X |
| 5,076,496 | 12/1991 | Lippmeier | 239/265.33 X |
| 5,174,502 | 12/1992 | Lippmeier et al. | 239/265.19 X |
| 5,245,823 | 9/1993 | Barcza | 239/265.35 X |

*Primary Examiner*—Andres Kashnikow
*Assistant Examiner*—Steven J. Ganey
*Attorney, Agent, or Firm*—Norman Friedland

[57] ABSTRACT

The external flaps of a variable exhaust nozzle for a gas turbine engine are attached to the nozzle by a pair of pivotal rods attached to the nozzle's internal support structure and slidably fits into elongated spaced bushings extending along the longitudinal axis of the flaps formed in bosses extending orthogonally from the inner surface of the flaps. The attachment to the support structure includes a unison ball made from composite material that fits into a spherical track formed in a recess in the end of the rods. The method of installation is to insert one of the post into the first bushing that is offset from the second bushing. After the slight engagement of the first post, the second post is pivoted to align with its complementary bushing and the flap is positioned forward to fully engage the rods into the bushings. The aft end hinge of the flap is then attached. A limit pin that is attached to the post travels in a slot designed to limit the travel of the post. Another embodiment includes a damping function in the attachment.

16 Claims, 4 Drawing Sheets

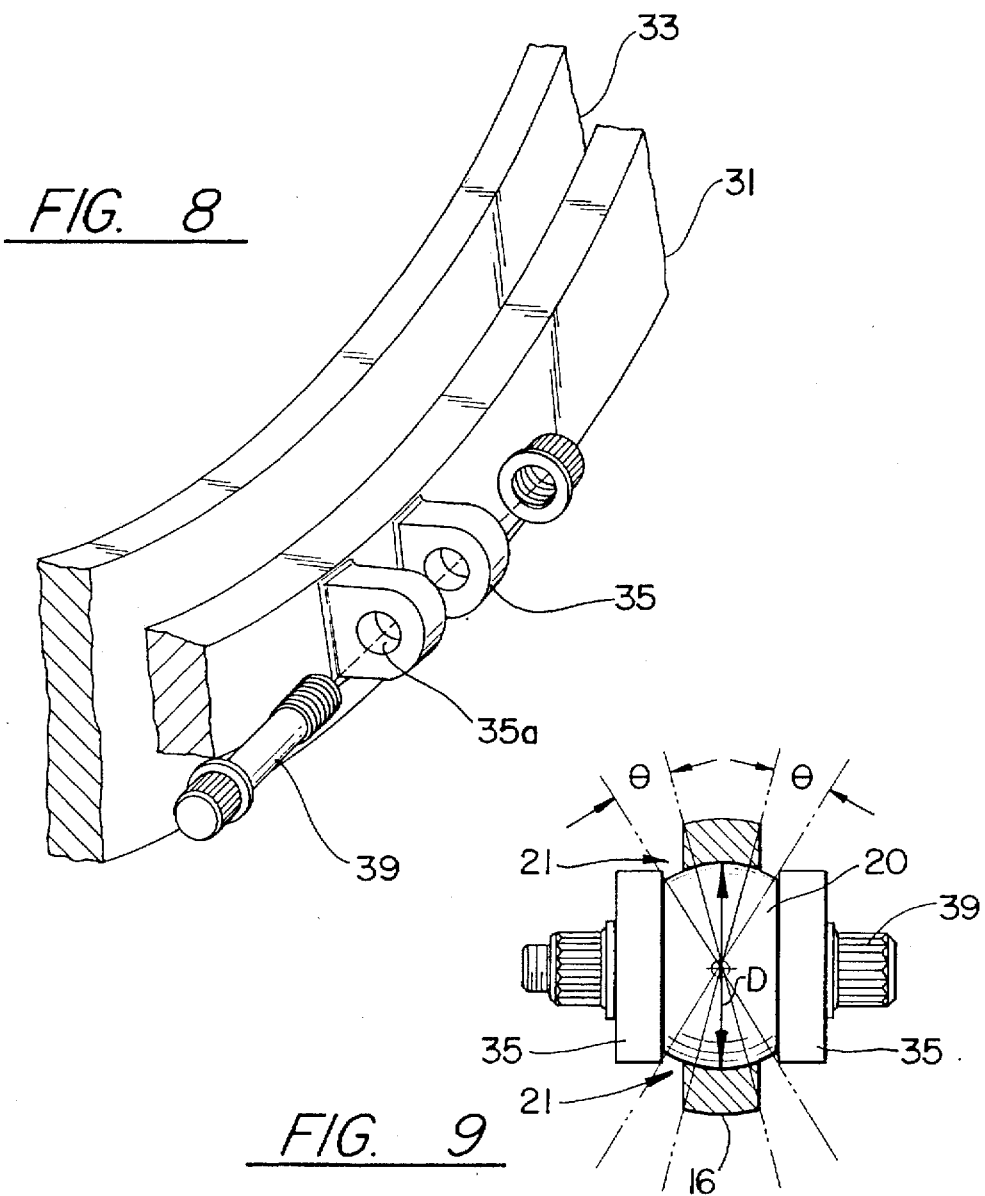
FIG. 8
FIG. 9
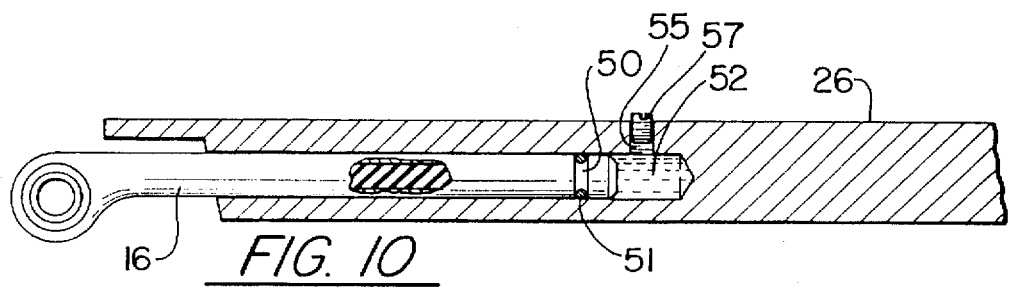
FIG. 10
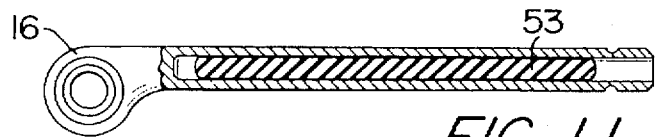
FIG. 11

ATTACHMENT MEANS FOR FLAPS OF VARIABLE EXHAUST NOZZLE

This invention was made under a U.S. Government contract and the Government has an interest herein.

TECHNICAL FIELD

This invention relates to gas turbine engines for aircraft and particularly to the attachment for the external flaps of the exhaust nozzle and the construction thereof.

BACKGROUND ART

The problem that is solved by the present invention is the means for attaching the variable external fairing (flaps) to the exhaust nozzle by making it less complicated in construction, easier to assemble and disassemble and generally obviate the heretofore known problems encountered with the previously designed flaps. As is well known, the external flaps of the heretofore known designs are kinematically positioned by as many as six (6) different attachments. Some of these attachments are buried in the attendant kinematic structure making it difficult to assemble and disassemble. Because of the location of the attachment mechanism in these heretofore known flaps, the operator that assembles and disassembles these parts could be subjected to sharp edges when reaching inside when securing and removing the various attachment components during these operations.

External flaps are disclosed in U.S. Pat. Nos. 2,813,395 granted to R. E. Meyers on Nov. 19, 1957 and assigned to United Technologies Corporation, the assignee common to this patent application and U.S. Pat. No. 3,954,225 granted to Camboulives et al on May 4, 1976. As noted from the specifications of these patents the attachment means are significantly different from the attachment means of the present invention and as will be described herein below, this invention simplifies the attachment structure and facilitates the assembly and disassembly of the external flaps.

This invention obviates the problems alluded to in the above paragraphs by including a sliding assembly at one end of the flap and a single attachment at the other end. The sliding assembly includes a pair of premounted rods or hinge links pivotally attached to the supporting structure in the exhaust nozzle. The rods may be permanently mounted during the build-up of the exhaust nozzle, so that they are already in place ready to receive the other attachment mechanism of each of the flaps. Complementary bushings are integrally formed on the flap and are adapted to accommodate the rods. In installing the flap to the exhaust nozzle, the operator positions the flap and aligns a first one bushing and further pushes on the flap so that first post engages its complementary bushing. The next post is aligned with its complementary bushing and the flap is positioned further so that the next post engages its complementary bushing and the flap is then moved to its desired position for full engagement of the rods with their respective bushings. Once this is accomplished the hinge on the opposite end of the flap is secured making the assembly and disassembly a relatively easy chore and avoiding the necessity of attaching components in blind locations which could be uncomfortable for the operator.

SUMMARY OF THE INVENTION

An object of this invention is to provide an improved attachment means for the external flaps of the exhaust nozzle of a gas turbine engine. This invention is characterized as being simple in construction, ease of assembly and disassembly, is relatively light weight (lighter than heretofore known designs) and has the propensity of avoiding injury to the operators that install and maintain these components.

A feature of this invention is the utilization of a composite unison ball mounted in a light weight titanium rod. This construction provides a relatively low wear, long lifed composite/titanium lost motion kinematic linkage system. The flaps are maintainable in the field without the necessity of removing the exhaust nozzle from the engine to make repairs. The unison ball is replaceable by a simple manipulation with the use of the operator's fingers by applying a small pressure to release and insert the ball in its receptacle. This is in contrast to heretofore known systems that are heavier, wear prone and typically scrapped at a significant cost as contrasted with refurbishing the attachment mechanism in the field at a relatively minimal cost.

The foregoing and other features of the present invention will become more apparent from the following description and accompanying drawings.

BRIEF DESCRIPTION OF DRAWINGS

FIG. 8 is an exploded view in perspective illustrating a portion of the attachment mechanism;

FIG. 9 is a partial view showing the details of the unison ball in the assembled position; and FIG. 10 exemplifies another embodiment of this invention that employs a damping feature.

FIG. 11 exemplifies another embodiment of this invention employing another damping feature.

DETAILED DESCRIPTION OF THE PREFERRED EMBODIMENT

Although this invention shown in its preferred embodiment discloses the details of the attaching mechanism, for the sake of convenience and simplicity the details of the variable exhaust nozzle module are omitted from this description. The variable exhaust nozzles of the type being utilized with this invention are currently being used on the F100 engines for powering aircraft such as the Air Force's F15 and F16 models which engines are manufactured by Pratt and Whitney Division of United Technologies Corporation. For further details of external flaps reference should be made to these engines and the patents referred to in the earlier paragraph.

It should be understood that the external flap configuration is a component of the exhaust nozzle and freely articulates as part of a variant four (4) bar linkage system. When under load conditions it provides for the four (4) bar linkage system of the variable exhaust nozzle the travel and any dead travel requirements during any and all positions of the nozzle articulation. The flap structures typically made from graphite polyimide composite material are self lubricating and structured to position flap corners without need for corner screws or any other attachments.

Figure 1:
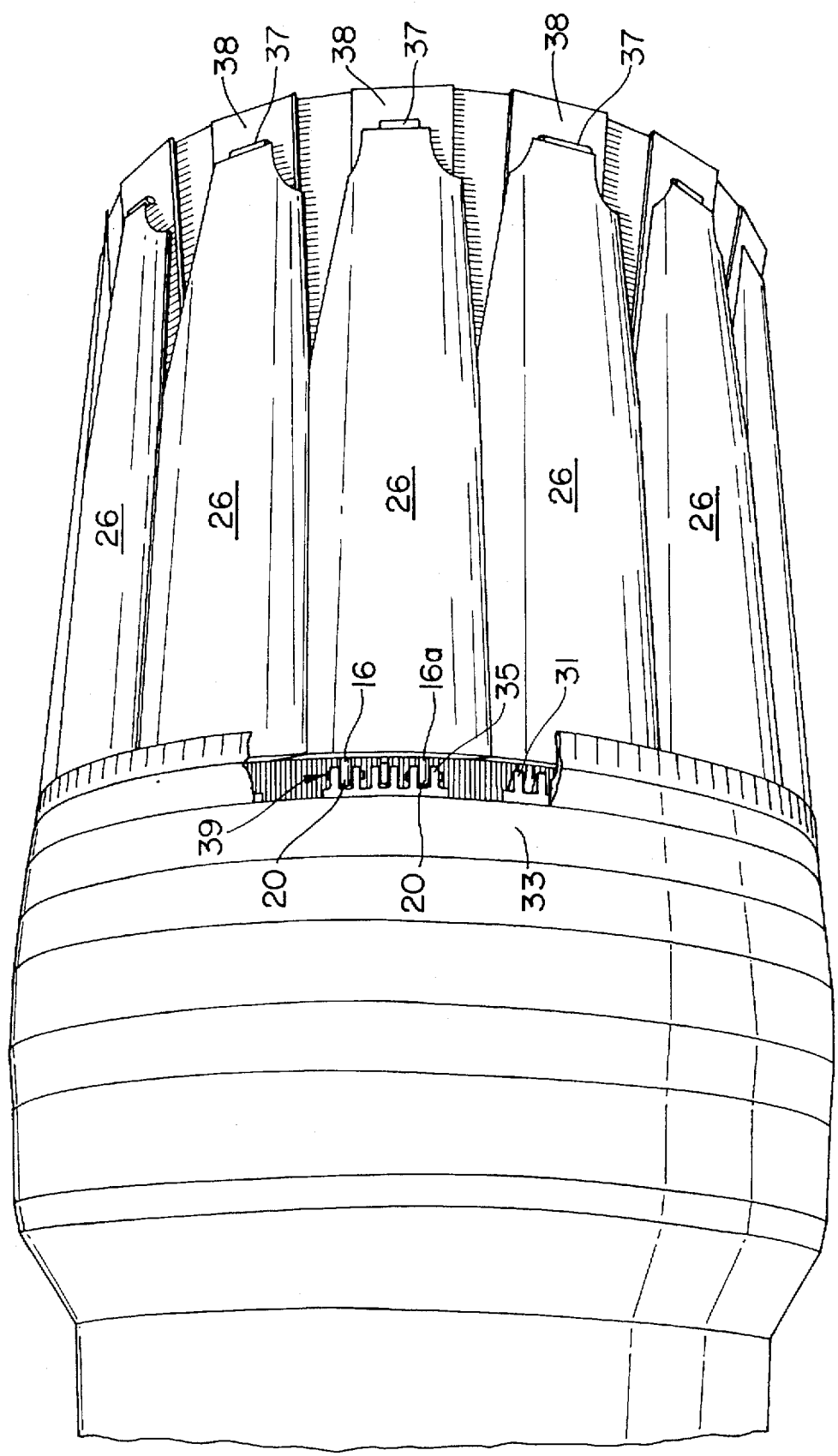
FIG. 1 is a perspective view illustrating the external flap assembly of an exhaust nozzle for a gas turbine engine.

The invention is best seen by referring to FIGS. 1–5, where FIG. 1 shows an assembled exhaust nozzle with a plurality of external flaps generally indicated by reference numeral 26 attached to the exhaust nozzle module and FIGS. 2–5 show the detail components of this invention. As will be described in more detail hereinbelow, one end of the external flap 26 is attached to nozzle support structure and the opposite end is attached to the inner flap indicated by reference numeral 38 in the divergent section of the exhaust nozzle. As shown in this embodiment fifteen external flaps 26 are equally and circumferentially spaced around the exhaust nozzle however the number of flaps utilized is predicated on the particular engine.

Figure 2:
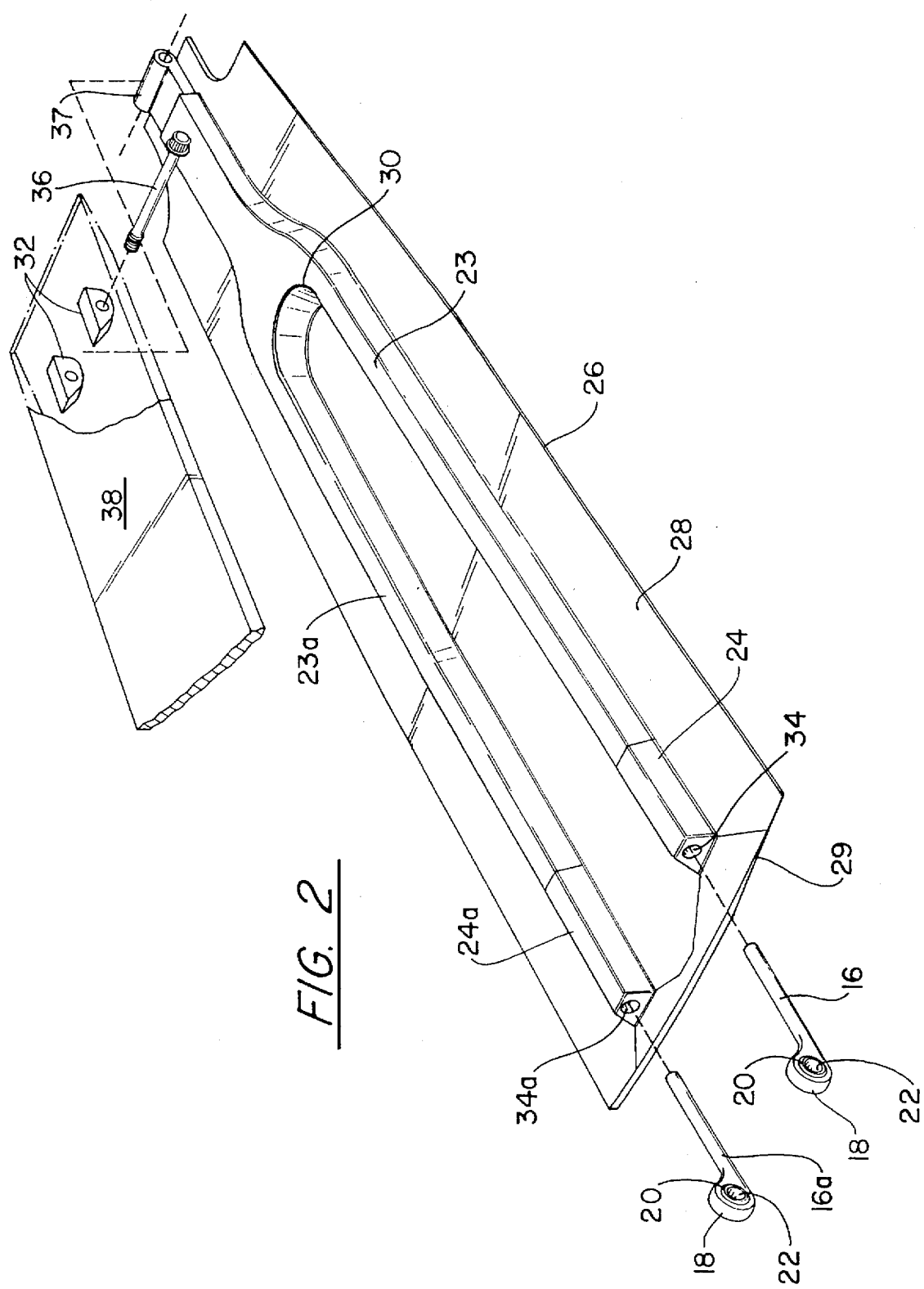
FIG. 2 is an exploded view in perspective illustrating the hinge components of this invention for each of the flaps.
Figure 3:
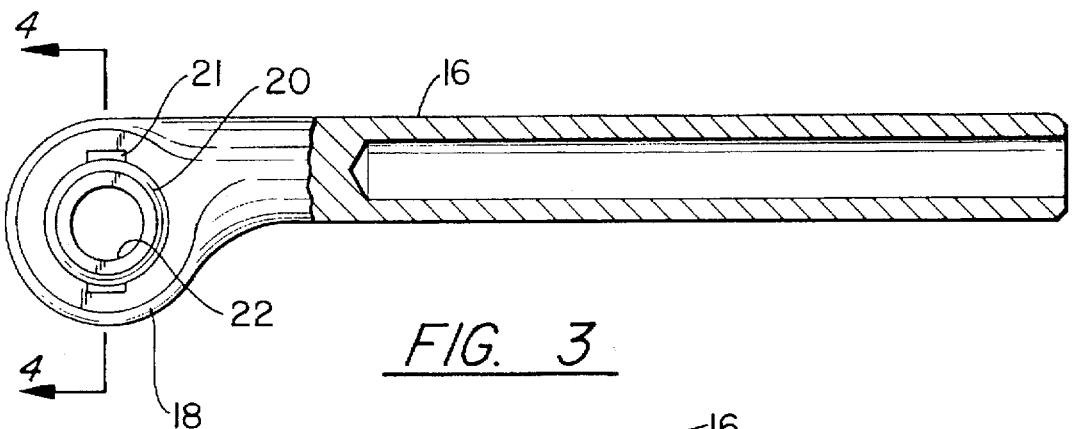
FIG. 3 is a view in elevation showing the attachment rod of this invention.
Figure 4:
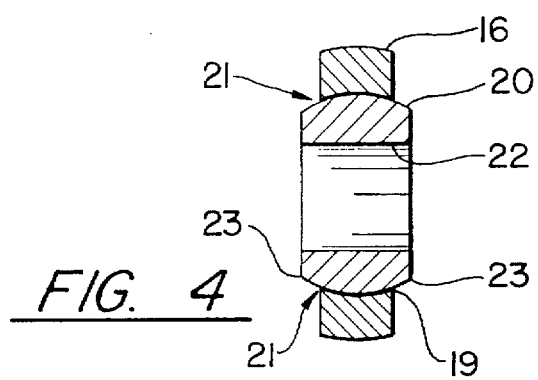
FIG. 4 is a sectional view taken through lines 4—4 of FIG. 3 showing the unison ball of this invention.
Figure 5:
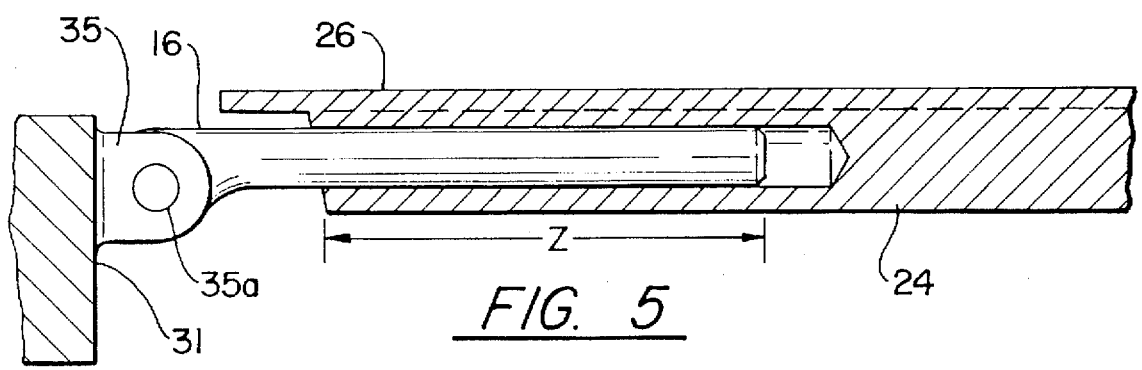
FIG. 5 is a partial view in section showing the attachment of the attachment rod and forward hinge of the flap.

As mentioned in the above paragraph, the external flap is attached to the nozzle support structure as shown in FIGS. 1 and 2 by the segmented support member 31 which, in turn, is suitably attached to the nozzle's annular frame 33 and is buried underneath the outer skin or finger seal of the exhaust nozzle. The support structure 31 consists of a curved back plate having a pair of axially extending ears 35 carried on support member 31 which essentially is a blind bracket at each end and each pair of ears includes opposing apertures 35a adapted to receive a multi-piece axle and retainer 39 for supporting the hinge link or rod as will be detailed herein below. A similar structure is used for each of the flaps.

As is obvious from an inspection of U.S. Pat. Nos. 2,813,395 and 3,954,225, supra, that as this portion of the external flap attaching mechanism is being assembled, it is out of view or easy access to the operator or assembler. Since this attachment structure including a blind bracket is located in the same location as the heretofore known attachment mechanism and is not visually seen, the assembly and disassembly of the flaps of the heretofore attachment mechanism created a myriad of problems which could lead to injuring an inattentive assembler when installing or removing the flaps from the installation, particularly after the edges have worn into sharp edges. Not only is this time consuming, it is made more difficult in inclement weather where the operator is exposed to cold, hot and/or wet conditions.

As noted in FIGS. 2–5, the attachment mechanism of this invention includes a pair of spaced rods 16 and 16a that has an enlarged end 18 adapted to carry a unison ball 20 fitted into a frusto spherical shaped recess 19. The unison ball 20 is configured into a partially spherical shape with flat sides 23 that when rotated to align with the loading slots or snap rims 21 (one or two slots may be provided) formed adjacent recess 19 are sufficiently compliant to snap into the complementary configured recess formed on the enlarged end 18 of the rod 16. The receiver snap rims are sized and configured to accommodate the diameter of the unison ball 20. Unison ball 20 is fitted on an enlarged single piece axle, pin, or bolt 39 for pivotal movement such that rods 16 and rod 16a have freedom of movement along a plane transverse to the axis of the central opening 22 as well as alignment freedom about the spherical diameter of the unison ball 20. Hence, these outer external flaps will freely align and change positions as the exhaust nozzle is varied to change its geometry. And as will be described hereinbelow, the rods 16 and 16a will be pivoted when the exhaust flap attachments 36 are individually assembled and disassembled.

A pair of spaced elongated composite structural ribs 23 and 23a carrying the integral bosses 24 and 24a, respectively, are formed integrally with the flap 26 and extend from adjacent the fore end to the aft end and protrude orthogonally from the underside surface 28. Ribs 23 and 23a extend substantially the length of the flap and join to form a single extension portion 30 that serves to support the aft hinge 37. It should be understood that the length of the bosses 24 and 24a are predicated by the travel and length of the rods 16 and 16a. The apertures 34 and 34a formed to extend axially therein to define bushings for supporting the rods 16 and 16a and do not necessarily have to extend the expanse shown. For ease of assembly, the bosses are offset one relative to the other so that one boss extends axially closer to the forward edge 29 as shown in FIG. 2. This allows freedom of movement of the other rod when one of the rods first engages its bushing. Hence, when the rod 16a is partly inserted into bushing 34a, the other rod 16 will be sufficiently spaced from the end of its complementary bushing 34 so that it can be rotated to align with the bushing 34. After alignment, the operator or assembler merely moves the flap forward for total engagement of rods 16 and 16a.

Once the rods are inserted into their respective bushings, the flap 26 is rotated about the axis of the hinge axle 39 to align with the external flap hinge 37 and the exhaust flap hinge 32. In turn, hinge 37 is secured to the exhaust flap hinge 32 by the single attaching axle, pin or bolt 36. As is apparent from the foregoing when the flaps are displaced radially relative to the exhaust nozzle center line, the rods 16 and 16a are free to translate rectilinearly relative to the bushings 34 and 34a. The engagement depth of the rods 16 and 16a is set to carry in-board/out-board dynamic loading via these rods while providing for a dead link function in systems that employ a modulated four bar kinematic system for actuating the flaps. As noted in FIG. 5, the wear area Z is significantly increased over heretofore known linkage systems.

It is also apparent from the foregoing that removal of the flap for maintenance purposes or the like, is a simple procedure that merely requires unsecuring the aft hinge 37 and allowing the flap 26 to pivot and be removed from the respective rods by sliding the flap rearwardly until the respective rods disengage from their respective bushings. Since there are no hidden connections, it is readily seen that the assembly and disassembly of the flaps with this unique light weight attachment are relatively easy procedures.

The rods 16 and 16a which are preferably made from light material such as titanium which is hollowed out at the aft end to make the units even lighter. The unison ball 20 is fabricated from a suitable light weight composite material such as a polyimide resin reinforced with graphite and fibers, if desired and is sufficiently dimensioned and compliant to fit into the slot of the partially spherical recess formed in the end of rods 16 and 16a.

Figure 6:
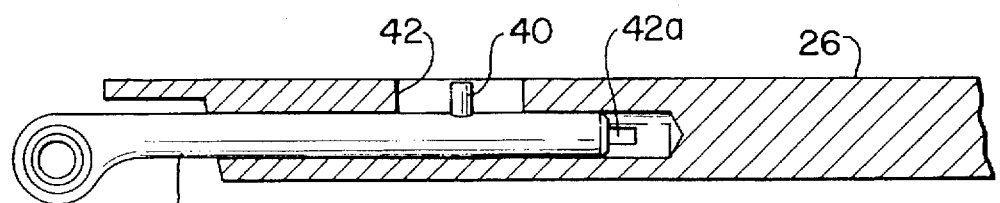
FIG. 6 is a partial view in section illustrating an optional displacement limiter of the movement of the attachment rod relative to the flap engaged by a slight rotational motion of the flap after the alignment and insertion.
Figure 7:
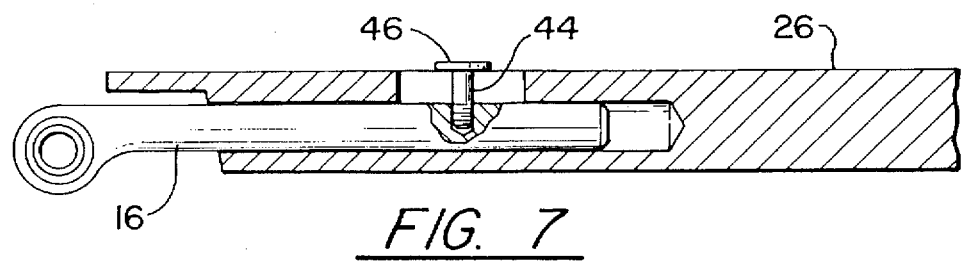
FIG. 7 is a partial view in section exemplifying another limiter similar to the limiter depicted in FIG. 6.

FIGS. 6 and 7 disclose limit means to limit the displacement of the rods 16 and 16a and prevent the rods from being inadvertently dislodged from the bushing or to limit structural deflection, if desired. The use of limits for the attachment mechanism is optional and may or may not be utilized without departing from the scope of the invention. One of the limiters is depicted in FIG. 6 and as shown therein, pin 40 is affixed to the outer diameter of the rods (rod 16 being selected for description purposes and like reference numerals depict like elements in all the FIGS.) and protrudes normal to the rod and extends into slot 42 cut into the boss 24. Receiver slot 42a is provided to allow clearance for pin 40 as rod 16 is inserted. The flap is held in a 90 degree position during the initial insertion and then rotated in position when the front of slot 40 is reached. The pin 40 is attached to rod 16 in a well known manner by brazing or welding it to the rod in situ. Obviously the extend of travel of the pin and hence rod 16 is predicated on the axial length of slot 42 with the flap in its true position. In FIG. 7 a bolt 44 threadably engages threads formed in the rod 16 and carries the installation torque drive head 46 that may overlie a portion of the surface of flap 26 and as in the structure depicted in FIG. 6, limits the travel of rod 16 to the length of slot 42.

FIG. 9 discloses the unison ball 20 and rod 16 in the assembled position where the blind brackets 35 are tightened against the unison ball 20 with sufficient load as to deflect the unison ball 20 so that the ball is slightly deformed and the diameter indicated by reference letter D is slightly enlarged. This connection feature serves to improve the fit of the unison ball into the enlarged end of rod 16. The freedom of motion of the rod 16 on the unison ball 20 depicted in the relative rotational movement represented by angle θ, prevents point contact as does the lost motion of the rod 16 in the flap. All true wear surfaces including the wear area Z (FIG. 5) are significantly increased in comparison to heretofore known systems. This aspect together with the selection of materials of the boss 24 and unison ball 20 (graphite composite) provide for self lubrication of all wear surfaces with a consequential improvement in the service life of these components. It has been found that the improvement in service life exceeds ten orders of magnitude.

Attachment means made in accordance with this invention is not only less complicated and facilitates the installing and removing of the external flaps, the attachment mechanism is lighter in weight, significantly reduces the installation and maintenance time and eliminates the potential injury problems that were prevalent heretofore.

FIG. 10 exemplifies another embodiment of this invention by incorporating a damping function by filling the volume in cavity 52 at the end of the rods 16 and 16a with a compressible medium, which may be, for example, a gas or elastomeric material. The damping sliding seals 51 are provided and fitted into an annular groove 50 formed at the end of rods 16 and 16a to damp and prevent the leakage of the damping medium. A filling hole 55 may be provided to insert other damping media in cavity 52 which is sealed by the sealing plug 57. Hence, as pressure fields act on internal flaps 32 and external flaps 26, the resultant motion causes rods 16 and 16a to compress and expand the absorber media which serve to dampen this motion.

Damping may also be achieved by the method exemplified in FIG. 11 which shows the hollow portion of the rod 16 fitted with a damping media in a containment, such as a rubber or silicone material insert 53. This material insert 53 is inserted prior to the assembly of the rod 16. This provides for a simple containment of a damping media and it is held in place by friction so that it facilitates the handling thereof during the assembly of the remaining components. It is apparent from the foregoing, the assembly and disassembly of the rods 16 and 16a are no more complicated than the assembly without the damping feature.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. Attachment means for external flaps of a variable area exhaust nozzle of the type that includes inner flaps and outer flaps for a gas turbine engine, the exhaust nozzle having a generally cylindrical outer casing and an annular support structure, a blind bracket affixed to said annular support structure, said attachment means including at least one pivotal hinge link pivotally attached to said blind bracket having a cylindrical shaped portion extending beyond said blind bracket, at least one boss orthogonally formed on said external flap and extending axially thereon, a bushing formed in said boss for unmovably insertion of said cylindrical portion for slidably supporting said hinge link for hingedly supporting one end of said external flap and means for supporting the other end of said external flap for articulate movement when the area of said exhaust nozzle is varied whereby assembly and disassembly of said external flap is facilitated.

2. Attachment means for external flaps as claimed in claim 1 wherein said cylindrical shaped portion is made from material that exhibits shear and bending loadings compatible with the loads imposed on said inner flaps and said outer flaps.

3. Attachment means for external flaps as claimed in claim 2 wherein said material is titanium or titanium alloy.

4. Attachment means for external flaps as claimed in claim 1 wherein said pivotal hinge link includes a bulbous end, a recess formed in said bulbous end and a unison ball fitted into and retained in said recess for relatively free rotational movement and wear resistance.

5. Attachment means for external flaps as claimed in claim 4 wherein said unison ball is made from a self-lubricating composite material.

6. Attachment means for external flaps as claimed in claim 1 wherein an additional boss orthogonally formed on said external flap is parallelly spaced from said one boss and having a bushing, another hinge link pivotally attached to said blind bracket for removable insertion into said bushing for hingedly supporting said external flap.

7. Attachment means for external flaps as claimed in claim 6 wherein each of said external flaps include a forward edge, said one boss and said additional boss are spaced from said forward edge and said one boss being axially offset relative to said additional boss.

8. Attachment means for external flaps as claimed in claim 7 wherein said internal flap includes rearward attachment means, and said means for supporting the other end of said rearward attachment means includes at least a single hinge member for being hingedly attached to said rearward attachment means.

9. Attachment means for external flaps as claimed in claim 8 including limit means for limiting the sliding movement of said hinge link relative to said bushing.

10. Attachment means for external flaps as claimed in claim 9 wherein said limit means includes a pin affixed to said cylindrical portion in situ and extending orthogonally into a slot formed in said boss.

11. Attachment means for external flaps as claimed in claim 9 wherein said limit means includes a threaded member threadably attached to said cylindrical portion extending into a slot formed in said boss and said threaded member having a torquing head having a portion overlying a portion of said flap adjacent said slot.

12. Attachment means as claimed in claim 7 wherein said cylindrical portion and said bushing of said attachment means cooperate relative to each other to provide a dead link function when a four bar linkage system is utilized to actuate said external flaps.

13. Attachment means as claimed in claim 1 wherein said boss includes a cavity disposed at the end of said cylindrical portion, damping means in said cavity to dampen the motion of said cylindrical portion resulting from the forces imposed on said external flaps.

14. Attachment means as claimed in claim 13 including seal means affixed to said cylindrical portion in sliding relation relative to said boss.

15. Attachment means as claimed in claim 14 wherein said cylindrical portion includes a rod having a recess accessible from on one end of said rod, said damping means including an elastomeric material fitted into said recess whereby said elastomeric material is in friction relationship internally with the surfaces defining said recess for absorbing the energy of the vibration encountered.

16. Attachment means as claimed in claim 14 wherein said cylindrical portion includes a rod having a recess accessible from on one end of said rod, said damping means including an elastomeric material fitted into said recess whereby said elastomeric material is in friction relationship with the surfaces defining said recess for absorbing the energy of the vibration encountered.

* * * * *